June 14, 1938.
F. W. DUNMORE
2,120,245
COURSE INDICATOR FOR THE DOUBLE AND TRIPLE
MODULATION DIRECTIVE RADIO BEACONS
Filed March 9, 1932
3 Sheets-Sheet 1
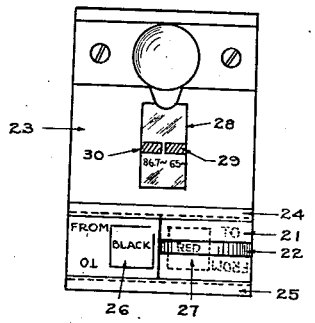
FIGURE 1
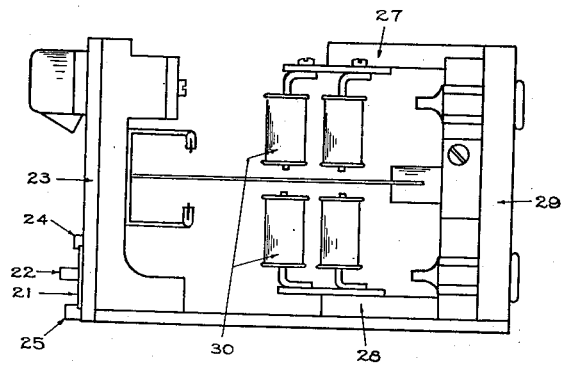
FIGURE 2
FIGURE 3
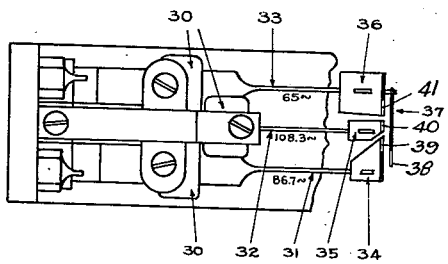
FIGURE 4
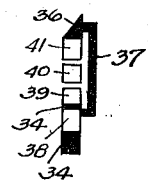
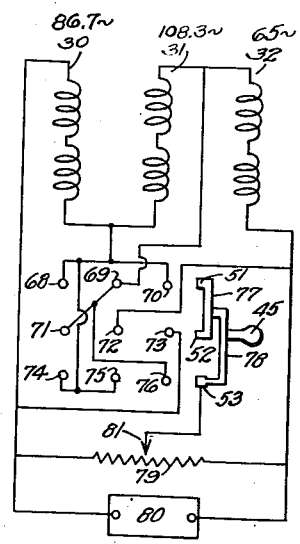
FIGURE 11
Inventor
Francis W. Dunmore
By J. F. Mothershead
Attorney June 14, 1938.　　　　F. W. DUNMORE　　　　2,120,245
COURSE INDICATOR FOR THE DOUBLE AND TRIPLE
MODULATION DIRECTIVE RADIO BEACONS
Filed March 9, 1932　　　　3 Sheets-Sheet 2

Inventor
Francis W. Dunmore
By J. T. Mothershead
Attorney

June 14, 1938.  F. W. DUNMORE  2,120,245
COURSE INDICATOR FOR THE DOUBLE AND TRIPLE
MODULATION DIRECTIVE RADIO BEACONS
Filed March 9, 1932   3 Sheets-Sheet 3

Inventor
Francis W. Dunmore
By J. J. Moorhead
Attorney

Patented June 14, 1938

2,120,245

UNITED STATES PATENT OFFICE 2,120,245

COURSE INDICATOR FOR THE DOUBLE AND TRIPLE MODULATION DIRECTIVE RADIO BEACONS

Francis W. Dunmore, Washington, D. C., assignor to the Government of the United States as represented by the Secretary of Commerce Application March 9, 1932, Serial No. 597,755

9 Claims. (Cl. 177—352)

(Granted under the act of March 3, 1883, as amended April 30, 1928; 370 O. G. 757)

The invention described herein may be manufactured and used by or for the Government of the United States for governmental purposes only without the payment of any royalty thereon.

My invention relates to improvements in apparatus and methods used for guiding mobile objects, such as airplanes, along one of the courses of a directive radio beacon and particularly to guiding such mobile vehicles along a selected course of a double-modulation four-course directive radio beacon or along a course of a triple-modulation twelve course directive radio beacon.

This invention is an improvement upon my prior invention of a radio course indicator provided with means for receiving from a single station two waves modulated to different frequencies which are broadcast from the station and means for utilizing these received impulses to operate an indicator which shows whether or not an airplane, or the like is following a course from or toward the radio beacon.

Prior to my invention, the double-modulation radio beacons yielded only two useful beacon courses. When the number of airways or lanes of travel converging at a radio-beacon station was increased there was immediately created a need for radio beacons yielding a greater number of useful courses and indicators for use on the airplanes by means of which any one of the beacon courses corresponding to a selected airway may be followed. The need for an increase in the number of useful beacon courses was supplied by the development of a double-modulation directive radio beacon yielding four useful courses, normally spaced ninety degrees apart, as well as a triple-modulation directive radio beacon yielding twelve useful courses, normally spaced thirty degrees apart.

This increase in the number of radiating beacon courses created a need for an improved form of indicator on the airplane because a pilot equipped with an old form of indicator, such as the tuned reed type of visual indicator, would be unable to determine the direction in which he is flying along a beacon course; that is, whether he is flying toward or away from the radio beacon, nor would he be able to identify one course from other courses identified by waves having the same carrier and modulation frequencies when a pilot is flying over an unfamiliar route or under conditions of poor visibility he cannot supplement the reading of his indicator by familiar landmarks, so that he may, instead of being directed along the airway which he has chosen, be flying in an entirely different direction and over rough terrain or bodies of water on which he cannot safely land.

Since it is now possible to send radio-beacon signals to great distances by means of the improved high power radio beacons, and as airplanes fly at high speeds, an error in the identification of the beacon course may not be detected until after a considerable distance in a wrong direction may have been traveled, resulting in a considerable delay in reaching the selected destination with a corresponding waste of fuel. My invention provides means for the identification and the following of any one of all of the beacon courses emanating from a double-modulation four-course directive radio beacon and also from a triple-modulation twelve-course directive radio beacon.

For the purpose of readily identifying a selected airway with its beacon-course, a pilot is provided with suitable maps with the airways identified by means of arbitrarily assigned colors. A reed indicating unit on the airplane is provided with a plurality of colored rectangles and movable shutters which are adapted to expose certain of the colored rectangles and certain of the reeds simultaneously while covering up the remaining colors and reeds. By these means, an airplane pilot who may be flying in a fog may identify the beacon-course along which he is flying as that marking a particular airway.

Other uses for and advantages which may be gained by the use of my invention will be more clearly understood by reference to the following description and the accompanying diagrammatic drawings.

In these drawings:—

Figure 1 is a front view of a form of my device adapted for use with a four-course radio beacon.

Figure 2 is a side view as seen from the left of Figure 1.

Figure 3 is a plan view of my twelve course reed indicator, showing reeds, dampers and an extension arm carried on one of the reeds.

Figure 4 is a face view of the upturned tabs on the reed ends as seen from the left of Figure 3.

Figure 11 is a diagrammatic view showing the circuit arrangement for switching the proper driving coils in and out of circuit.

Figure 5:
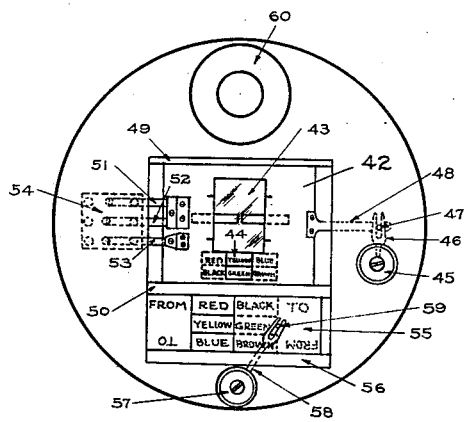
Figure 5 is a front view of my twelve-course reed indicator in a frame which is adapted to be revolubly mounted in an instrument panel.
Figure 6:
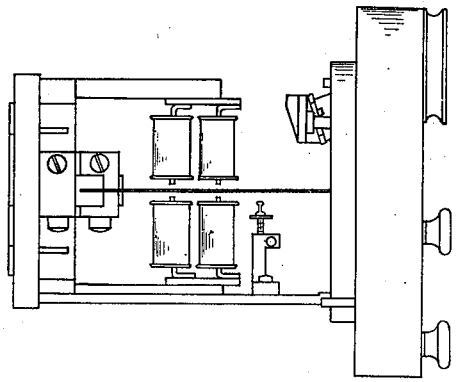
Figure 6 is a side view of the twelve-course reed indicator as seen from the left of Figure 5.
Figure 7:
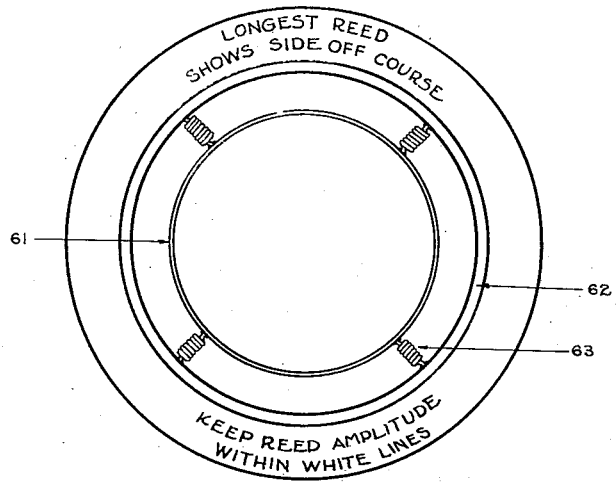
Figure 7 shows a shock proof mounting for the reed indicator shown in Figs. 5 and 6.

In Figures 1 and 2 a two-course reed indicator is modified by my invention to serve on airways equipped with four-course beacons.

The numeral 21 denotes a shutter having a ribbed handle 22, the shutter being mounted on the face of a tuned reed indicator 23 by means of guides 24 and 25. This shutter is manually set to cover either a black square 26 or a red square 27 on the face of the indicator as well as the words "To" and "From" adjacent to the covered square.

Through an opening 28 there is seen an upturned whitened end 29 of a vibrating reed tuned to say sixty-five cycles and a whitened end 30 of a companion reed tuned to say eighty-six and two thirds cycles. These reeds may be made of elinvar, which makes their natural periods of vibration independent of the temperature; Allegheny electric metal has been found suitable. Each is polarized by a set of permanent magnets, common to all of the reeds, reference being made to the Bureau of Standards Research Paper No. 28 and to the Bureau of Standards Journal of Research volume 1 pp. 751–769 F. W. Dunmore, Design of tuned-reed course indicators for radiobeacons, for other details of construction of the two-course reed indicator upon which this form of my present invention is an improvement.

A pilot using my improved four course tuned reed indicator consults his map from which he finds that the airway which he wishes to take is identified as, say "a black" course.

He then sets the shutter 22, Figure 1; to expose the black rectangle and steers his airplane so as to cause the reed tabs 29 and 30 to vibrate equally, then by steering to one side of this course he observes which reed vibrates the greater amount. If the word "From" appears right side up alongside of the exposed black rectangle and when he has turned to the right of the beacon course the right hand reed appears longer he finds that he is flying "from" the beacon on a black airway. If, instead, the left hand reed appears longer when he deviates to the right of the course he knows that he is flying "toward" the beacon, and if he wishes to continue in that direction he reverses the reed indicator, when it will give the correct indication as to the variations from his correct course, or if he has been flying in the wrong direction along the black course, obviously he has only to turn his plane one hundred and eighty degrees and then steer this course by means of my reed indicator.

The four course tuned-reed indicator is not suitable for use with the twelve-course radio beacons and to supply the need for a twelve course indicator I have invented a new form illustrated in Figures 3 to 8, in which I have introduced a third vibrating reed which is responsive to the third wave frequency used on the 12 course beacon. If the radio beacon uses waves modulated to eighty six and two third cycles, one hundred and eight and three tenths cycles and sixty five cycles, the reeds in the indicator are obviously tuned to these frequencies. I therefore provide three reeds, 31; 32; and 33 (Fig. 3) each provided with an air damper 34; 35; or 36, tuned to 86.7; 108.3 and 65 cycles respectively, the 65 cycle arm being provided with a light arm 37, extending laterally beyond the 86.7 reed, otherwise the separate reeds with the means for operating and adjusting the same may be the same as those of the four-course reeds.

For each of the twelve courses it is necessary to compare the relative amplitude of vibration of two of the three reeds and in order that this may be more easily seen I have arranged my device so that the two reeds in use will always appear to be adjacent. The 108.3 cycle reed is placed between the 86.7 and 65 cycle reeds, and in order to observe the 86.7 and 65 cycle reeds, the light arm 37 (Figs. 3 and 4) carries an extra white tab. 38, Figure 4 which tab vibrates adjacent to a tab 39 on the upturned front end of the damper 34 on the 86.7 cycle reed, while each of the other two air dampers 35 and 36 are provided with upturned whitened ends or tabs 40; 41 respectively. Thus there are three combinations of the reeds used in my 12-course indicator, each combination being used for four courses, for one set of courses the tabs 41 and 40 are used; for another, the tabs 40 and 39 and for the third set, the tabs 39 and 38, the tab 38 carried by the arm 37 necessarily vibrating with the 65 cycle reed 33.

For the purpose of aiding the pilot in observing the motions of the proper two reeds for a given set of courses, I provide a shutter 42, (Fig. 5) in which there is a window 43 of substantially the width of two tabs, this window also having a narrower extension 44 through which two of three sets of differently colored rectangles may be seen for each setting. These colors designate different courses. The shutter 42 may be manually set by means of a rotary handle 45 having a laterally extending forked arm 46 which engages a pin 47 in an extension 48 of the shutter 42, which is mounted to slide in two guides 49 and 50.

This slide also carries laterally extending electrical switch contact arms 51; 52; 53 of a selective switch 54 (see copending application Ser. No. 604,853 which matured into Patent No. 1,981,857) which are adapted to selectively short circuit the electrical circuit through the driving coils of whichever reed is not in use.

Fig. 11 shows the circuit arrangement for this switch. Here 30 is the driving coil for the 86.7-cycle reed, 31 the driving coil for the 108.3-cycle reed and 32 the driving coil for the 65-cycle reed. 68 to 76 are fixed switch contacts. 51, 52 and 53 are moving contacts, 51 making contact with 68, 69 or 70, and 52 making contact with 71, 72, or 73, and 53 making contact with 74, 75, or 76. Contacts 51 and 52 are connected together by arm 77. Contact 53 is insulated from arm 77 by arm 78. 45 operates the contacts 51, 52 and 53. 81 is the deviometer and 80 the receiving set exciting the coils 30, 31, and 32 depending upon the switch setting. When contacts 51, 52 and 53 are on 68, 71 and 74, respectively, the 108.3-cycle driving coil 31 is short-circuited and coils 30 and 32 excited so that the 86.7 and 65-cycle reeds operate with the common connection between their driving coils connected to slider 81 of deviometer 79. When contacts 51, 52 and 53 are on 69.72, and 75, respectively, the 65-cycle driving coil 32 is short-circuited and coils 30 and 31 are excited so that the 86.7 and the 108.3-cycle reeds operate and the common connection between their driving coils is connected to slider 81. When contacts 51, 52 and 53 are on 70, 73 and 76, respectively, the 86.7-cycle driving coil short-circuited and coils 31 and 32 excited so that the 108.3-cycle and the 65-cycle reeds operate and the common connection between the driving coils is connected to slider 81.

A secondary shutter 55 is supported by the underside of the guide 50 and a lower guide 56. This secondary shutter is adapted to be manually shifted by means of rotary handle 57 to cover three of six colored rectangles and the words "To" and "From" adjacent to the covered rectangles on the face of the reed indicator. The rotary handle 57 operates the secondary shutter by means of slotted arm 58 and pin 59. A handle 60 is used for rotating the entire reed indicator in its cylindrical housing 61, (Fig. 7), which is yieldingly supported in an outer housing or supporting frame by a plurality of springs 63.

A pilot when using my tuned-reed indicator for the 12-course radio range (see Figs. 5 to 7) follows the uniform rule that "Longest reed shows side off course" as when using the 4-course tuned reed indicator and therefore sets the shutters 42 and 55 to simultaneously show a color of a selected airway, found by consulting a properly colored airway map. This manual setting of the shutter also short circuits the operating coils of the one of the three reeds, which is not used, then when the exposed reeds vibrate equally the plane is on a course identified by this color. If it is found by steering to one side of the course that the wrong reed is the longest the reed indicator is readily rotated 180 degrees by means of the handle 60 whereupon it will give the correct indication as to the variations from his correct course in the desired direction of flight. My twelve-course reed indicator may be used with both the four and twelve-course radio beacons but for reasons of economy planes regularly using airways which are equipped with four-course beacons may be equipped with the less expensive four-course indicator.

Figure 8:
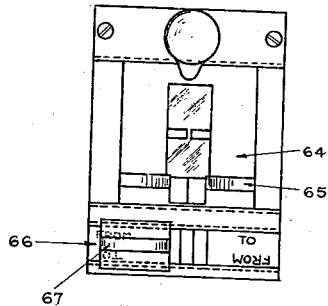
Figure 8 is a front view of a modification of my twelve-course reed indicator which is adapted for mounting in a rectangular socket in an instrument board which may be reversed by manually withdrawing it from the socket, turning it upside down and reinserting my reed indicator in the socket.
Figure 9:
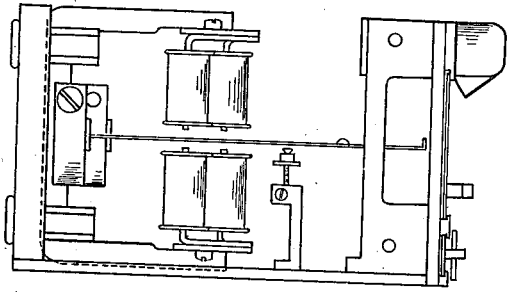
Figure 9 is a side view of the form shown in Figure 8 as seen from the left.
Figure 10:
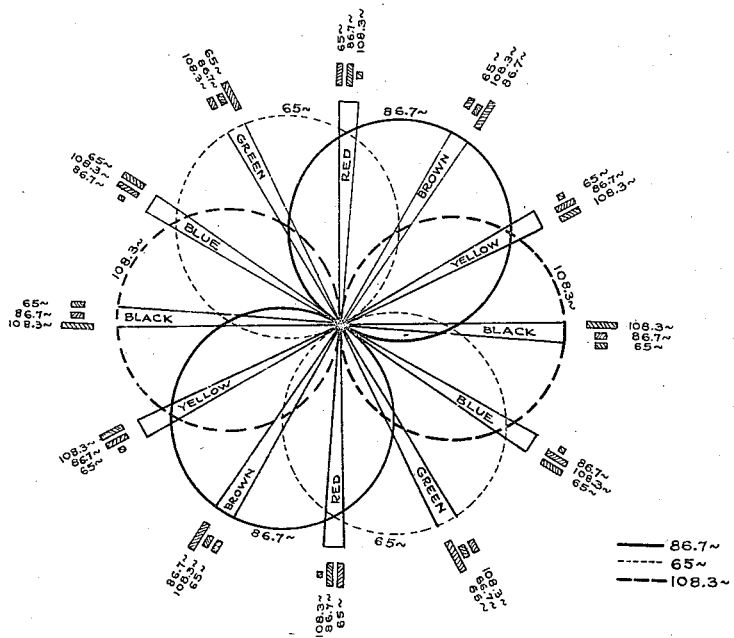
Figure 10 is a diagram showing how a plurality of airways radiating from a radio beacon may be identified by means of arbitrarily assigned colors and also the relative vibrations of each of the three reeds for each of the courses.

My twelve-course reed indicator may also be built in a rectangular form similar to that of the four-course indicator, see Figs. 8 and 9 in which 64 is a main shutter having a handle 65 and 66 is a secondary shutter having a handle 67.

Various modifications may obviously be made, for example, for the words "From" and "To" rrows may be substituted, a hinged door can be used instead of a slide (Fig. 1) and instead of the colored squares some other arbitrary marking may be used. The invention disclosed herein is therefore not to be restricted except as may appear in the claims as finally allowed.

What I claim is:—

1. A visual indicator of the tuned reed type having three vibrating reeds, of a damper for each of said reeds, of a visible tab carried by each of said vibrating reeds, and a supporting bar carrying an auxiliary tab mounted on one of the outside reeds which extends laterally past the companion reeds whereby the auxiliary tab is vibrated in unison with the reed to which it is attached and alongside the tab of the opposite outside reed.

2. In a visual radio beacon course indicator the combination with a plurality of reeds mounted adjacent to and in line with each other each tuned to a different frequency, a terminal tab at the free end of each reed, an extended arm attached to one of said reeds and provided with a supplemental tab so mounted on said arm as to appear adjacent to a tab on any other reed or reeds.

3. The combination with a visual indicator of the tuned reed type adapted to be reversibly positioned on an airplane instrument board and to be operated by the visual type radio beacon, of a plurality of course identifications on the face of said indicator, flight direction markings in inverse reading relation to each other associated with said course identifications and indicating opposite directions of flight relative to the beacon, means for exposing at will one of the course identifications and its associated direction markings such that when said indicator is positioned on the instrument board so that the exposed associated marking in reading position will indicate the direction of flight relative to the beacon when the reed vibrating with greatest amplitude is on the same side as the deviation of the airplane from the radio beacon course.

4. The combination with a course indicator of the tuned reed type adapted to receive signals from the visual type radio beacon with courses designated by different course identifications, said indicator being mounted on an airplane and capable of being turned to opposite positions, of three or more reeds in said indicator, indicating tabs on said reeds mounted adjacent to and in line with each other, and each reed being tuned to a different frequency, means for obscuring all tabs except any two adjacent tabs, a plurality of course identifications corresponding to the number of beacon courses and arranged to identify each reading of any two of adjacent tabs, and other markings in inverse reading relation to each other and associated with said course identifications for indicating opposite directions of flight on a course relative to the beacon, means for exposing at will course identifications and direction markings of a selected course so that the selected course identification and its associated direction marking in reading position will indicate the correct direction of flight relative to the beacon when the indicator unit is positioned to bring the associated direction marking denoting the desired direction of flight to reading position and the reed vibrating with greatest amplitude is on the same side as the deviation of airplane from the selected radio beacon course.

5. The combination with a multiple-reed course indicator having reeds, each tuned to a different frequency and each having "tell tale" indicating parts arranged adjacent to and in line with each other and a separate driving coil, all driving coils being connected in series, of a resistor with a variable contact, identifications on the indicator corresponding to the radio beacon courses and each arranged to be read with any set of adjacent "tell-tale" reed indications, a shutter adapted to expose at a given setting two adjacent "tell tale" indications and their course identifications, and a selector switch having contact members operated by the movement of said shutter and adapted to short circuit the driving coil of unexposed reed indications at a given setting and to connect said resistor to the terminals of the non-short-circuited driving coils, and said variable contact to the common connection between the non-shorted driving coils.

6. The combination with a multiple-reed course indicator adapted to be turned about one of its axis to opposite positions and having three or more vibrating reeds each tuned to a different frequency and each having "tell tale" indicating parts arranged adjacent to and in line with each other and a separate driving coil, of identifications on the indicator corresponding to the radio beacon courses each arranged to be read with any set of adjacent reed indications, a shutter adapted to expose at a given setting two adjacent "tell tale" indications and their course identifications, a second set of said course identifications each having associated therewith markings in inverse read position to each other and indicating direction of flight relative to the beacon, a second operated shutter adapted to expose to view selected course identifications of said second set and the associated direction inverse markings, so that when the said indicator is moved to reverse or opposite position the exposed course identification of the second set in its exposed direction markings in reading position will indicate the direction of flight relative to the beacon when the "tell tale" indication vibrating with greatest amplitude is on the same side as the deviation of the airplane from the select radio beacon course designated by the exposed course identification of the first mentioned set.

7. A visual indicator of the tuned reed type having three or more vibrating reeds arranged in adjacent alignment, a visible tab carried by each of said vibrating reeds, an auxiliary tab attached to one of the outside reeds and vibrated alongside the tab of the opposite outside reed, identification markings associated for reading with any two adjacent tabs, and a shutter supported in front of said tabs and provided with a window adapted to expose to view at a given setting two adjacent reed tabs and their identifications.

8. The combination with a visual course indicator provided with a base, of a rear member attached to said base, three or more reeds supported at one end by said base each tuned to a different frequency, a tab on the free end of each reed, said tabs being arranged adjacent to and in line with each other, electromagnetic means for driving each of said reeds, a front face plate attached to said base and having a plurality of colored sections indicating radio beacon courses and provided with a window exposing the tabs on all of said reeds, a shutter provided with a window and mounted to be moved in front of said first window to fully expose two adjacent tabs at a given position of said shutter and two of said plurality of colored sections at each setting of said shutter window, means for moving said shutter, and electrical circuit closing means associated with said shutter for selectively short circuiting the driving coil of the reed whose tab is not exposed at a given setting of said shutter.

9. In a visual radio beacon course indicator, the combination with a plurality of reeds mounted adjacent to and in line with each other and each tuned to respond to a different frequency, a supporting frame for said indicator providing a unit structure adapted to be mounted on an airplane instrument board and rotatable about its horizontal axis and provided with a face plate bearing a plurality of arbitrary course identifications arranged in two groups each group being associated with markings indicating opposite directions of motion placed in inverse reading relation to each other, and means for at will covering one group of identifications and the markings associated therewith, whereby beacon courses on an airway map identified by arbitrarily assigned identifications on the indicator may be compared with similar identifications exposed on said indicator and the flight direction markings associated therewith for giving an easily understood means for checking the course and direction actually being followed relative to the beacon.

FRANCIS W. DUNMORE.